UNITED STATES PATENT OFFICE.

CHRISTOPHER W. FENTON, OF BENNINGTON, VERMONT.

IMPROVEMENT IN THE COMPOSITION OF MATTER FOR FIRE-BRICKS.

Specification forming part of Letters Patent No. 393, dated September 22, 1837.

*To all whom it may concern:*

Be it known that I, CHRISTOPHER W. FENTON, of Bennington, in the county of Bennington and State of Vermont, have invented and discovered a new and useful Composition of Matter for the Manufacture of Fire-Bricks for the Interior of Blast, Air, and Cupola Furnaces, Glass Ovens, and all other places where fire-bricks are or may be commonly used; and I do hereby declare that the following is a full and exact description.

The nature of my invention and discovery consists in mixing in the manufacture of said fire-bricks the following substances, to wit: The earth usually denominated "kaolin" or "porcelain clay," and fine granular quartz or white sand or sandstone, frequently if not commonly used in the manufacture of glass, which bricks, when shaped and sufficiently dried, are baked in a high heat.

To enable others skilled in the art to make and use my invention and discovery, I will proceed to describe the manner in which I proceed.

I compose the said fire-bricks of the said kaolin or porcelain clay and fine granular quartz, being a species of pure white sand or sandstone, as before mentioned, in equal parts, or in any other available proportion, though I prefer equal parts, or nearly so. These two substances being intimately mixed together and moistened with water, so as to bring the whole to a proper consistency, I then shape the mass into bricks or other blocks by the aid of molds after the common manner of making bricks. When these bricks are sufficiently dried I bake them in a high heat, when they are fit for use, and will resist a greater degree of heat than any other substance or composition of matter known to the inventor applicable to this purpose.

What I claim as my invention and discovery, and wish to secure by Letters Patent, is—

The using and applying the aforesaid substances known under the name of "kaolin" or "porcelain clay" and fine granular quartz, being a species of white sand or sandstone, frequently used in the manufacture of glass, in the manufacturing of fire-bricks, which fire-bricks are capable of resisting an intense heat, and the composing said fire-bricks of these substances in any proportion, be it in equal or unequal parts.

Dated at Bennington, in the county of Bennington and State of Vermont, January 9, A. D. 1837.

CHRISTOPHER W. FENTON.

Witnesses:
 WILLIAM F. SOUTHWORTH,
 JEDEDIAH DEWEY.